US010538261B2

(12) United States Patent
Nowe

(10) Patent No.: US 10,538,261 B2
(45) Date of Patent: Jan. 21, 2020

(54) TROLLEY FOR CARRYING GOODS

(71) Applicant: Container Centralen A/S, Odense (DK)

(72) Inventor: Wim Nowe, s-Gravenzande (NL)

(73) Assignee: CONTAINER CENTRALEN A/S, Odense (NL)

( * ) Notice: Subject to any disclaimer, the term of this patent is extended or adjusted under 35 U.S.C. 154(b) by 0 days.

(21) Appl. No.: 15/250,653

(22) Filed: Aug. 29, 2016

(65) Prior Publication Data

US 2017/0057531 A1 Mar. 2, 2017

(30) Foreign Application Priority Data

Aug. 31, 2015 (NL) ...................................... 2015372

(51) Int. Cl.
| | |
|---|---|
| *B62B 3/00* | (2006.01) |
| *A47B 57/40* | (2006.01) |
| *A47B 57/34* | (2006.01) |
| *A47B 47/00* | (2006.01) |
| *A01G 9/14* | (2006.01) |
| *A47B 31/00* | (2006.01) |

(52) U.S. Cl.
CPC ............... *B62B 3/005* (2013.01); *A01G 9/143* (2013.01); *A47B 47/0083* (2013.01); *A47B 57/34* (2013.01); *A47B 57/40* (2013.01); *B62B 3/006* (2013.01); *A47B 2031/005* (2013.01); *B62B 2202/70* (2013.01)

(58) Field of Classification Search
CPC ..... A47B 57/40; A47B 57/34; A47B 47/0083; A47B 2031/005; B62B 3/005; B62B 3/006; B62B 2202/70; A01G 9/143

USPC .............. 108/106, 107, 110, 147.11, 147.12, 108/147.15, 147.17; D6/675, 675.1, D6/682.2, 705; 211/187
See application file for complete search history.

(56) References Cited

U.S. PATENT DOCUMENTS

| | | | | |
|---|---|---|---|---|
| 566,305 | A | | 8/1896 | Geuder |
| 615,127 | A | * | 11/1898 | Baker ..................... A47B 57/16 108/110 |
| 754,816 | A | | 3/1904 | Schriefer |
| 754,817 | A | | 3/1904 | Schriefer |
| 914,572 | A | | 3/1909 | Holden |
| 966,002 | A | * | 8/1910 | Fricke .................. A47B 57/265 108/107 |
| 1,136,245 | A | | 4/1915 | Leland |
| 1,171,064 | A | | 2/1916 | O'Connor |

(Continued)

FOREIGN PATENT DOCUMENTS

| | | |
|---|---|---|
| CA | 938767 | 12/1973 |
| DE | 2805261 | 2/1978 |

(Continued)

*Primary Examiner* — Jonathan Liu
*Assistant Examiner* — Devin K Barnett
(74) *Attorney, Agent, or Firm* — Peacock Law P.C.; Janeen Vilven; Justin Jackson

(57) ABSTRACT

A trolley comprising a plurality of rectangular and elongated shelves comprising a plate providing a surface for carrying goods, such as potted plants and flowers, and hooks, and a plurality of posts provided with a series of openings, such as slots, receiving the hooks. The hooks extend in lateral direction and a series of openings is provided in precisely one side of the posts or in precisely two and opposite sides of the posts.

6 Claims, 2 Drawing Sheets

(56) References Cited

U.S. PATENT DOCUMENTS

| | | | | |
|---|---|---|---|---|
| 1,366,743 | A | 1/1921 | O'Connor | |
| 1,386,168 | A | 8/1921 | Erickson | |
| 1,545,165 | A | 1/1922 | O'Connor | |
| 1,411,260 | A | 4/1922 | Baker et al. | |
| 1,554,011 | A | 9/1925 | Lehman | |
| 1,577,066 | A | 3/1926 | Medart et al. | |
| 1,708,588 | A | 4/1929 | Proctor | |
| 1,814,090 | A | 7/1931 | Mically | |
| 1,820,716 | A | 8/1931 | Vance | |
| 1,829,009 | A | 10/1931 | Madsen et al. | |
| 1,984,473 | A * | 12/1934 | Gibson | A47B 57/482 108/107 |
| 2,005,593 | A | 6/1935 | Onions et al. | |
| 2,026,223 | A | 12/1935 | Donnelly et al. | |
| 2,213,115 | A | 8/1940 | Bales | |
| 2,469,657 | A | 5/1949 | Linda | |
| 2,719,633 | A | 10/1955 | Rosenberg | |
| 2,907,471 | A | 10/1959 | Henry | |
| 2,936,078 | A | 5/1960 | Ziegler | |
| 3,168,365 | A * | 2/1965 | Evans | A47B 57/16 108/109 |
| 3,194,407 | A | 7/1965 | D'Altrui | |
| 3,294,250 | A | 12/1966 | Evans | |
| 3,341,027 | A | 9/1967 | Mackin, Jr. et al. | |
| 3,343,506 | A | 9/1967 | Buchbinder et al. | |
| 3,351,313 | A | 11/1967 | Guillon | |
| 3,366,432 | A | 1/1968 | Carmer | |
| 3,479,974 | A * | 11/1969 | Ferdinand | F16B 12/32 108/107 |
| 3,487,790 | A | 1/1970 | Rous | |
| 3,506,138 | A | 4/1970 | Travis | |
| 3,536,016 | A | 10/1970 | Chesley | |
| 3,556,309 | A * | 1/1971 | Schreyer | A47B 96/021 211/153 |
| RE27,186 | E * | 10/1971 | Ferdinand | A47B 57/44 108/107 |
| 3,705,654 | A * | 12/1972 | Barrineau, III | A47F 5/13 108/110 |
| 3,977,529 | A | 8/1976 | Stroh | |
| 3,986,616 | A * | 10/1976 | Gray | A47B 96/021 108/107 |
| 3,999,775 | A * | 12/1976 | Brongo | B62B 3/003 211/187 |
| 4,173,934 | A | 11/1979 | Searby | |
| 4,180,003 | A | 12/1979 | Clement | |
| 4,201,139 | A | 5/1980 | Suttles | |
| 4,292,902 | A * | 10/1981 | Barrineau | A47F 5/13 108/110 |
| 4,317,523 | A | 3/1982 | Konstant et al. | |
| 4,467,927 | A * | 8/1984 | Nathan | A47B 87/0223 108/192 |
| 4,500,146 | A | 2/1985 | Peterson | |
| 4,558,647 | A | 12/1985 | Peterson | |
| 4,582,001 | A * | 4/1986 | Leikarts | A47B 57/265 108/106 |
| 4,603,782 | A * | 8/1986 | Fenwick | A47B 57/20 108/107 |
| 4,620,637 | A * | 11/1986 | Karashima | A47B 96/00 211/126.1 |
| 4,696,406 | A * | 9/1987 | Karashima | A47B 96/021 108/110 |
| 4,796,541 | A | 1/1989 | Halstrick | |
| 5,065,873 | A | 11/1991 | Tseng et al. | |
| 5,218,914 | A * | 6/1993 | Dickinson | A47B 87/0223 108/186 |
| D338,792 | S * | 8/1993 | Chap | D30/120 |
| 5,400,719 | A * | 3/1995 | Santapa | A47B 87/0223 108/182 |
| 5,433,326 | A * | 7/1995 | Horian | A47B 47/00 211/188 |
| 5,632,389 | A | 5/1997 | Rosenband | |
| D380,762 | S * | 7/1997 | Sammut | D15/89 |
| 5,644,993 | A | 7/1997 | Dohnalik | |
| 5,718,441 | A * | 2/1998 | Kern | A47B 57/14 211/187 |
| 5,979,503 | A | 11/1999 | Abboud et al. | |
| 6,135,299 | A * | 10/2000 | Burgess | A47B 46/00 211/150 |
| 6,135,583 | A | 10/2000 | Simon et al. | |
| 6,189,707 | B1 * | 2/2001 | Meyers | A47B 57/045 108/108 |
| 6,220,464 | B1 * | 4/2001 | Battaglia | A47B 57/54 108/107 |
| 6,247,770 | B1 * | 6/2001 | Glass | A47B 57/44 108/107 |
| 6,273,281 | B1 * | 8/2001 | Berglund | A47B 57/50 108/107 |
| 6,286,694 | B1 * | 9/2001 | Battaglia | A47B 55/02 108/107 |
| 6,311,856 | B2 | 11/2001 | Battaglia et al. | |
| D496,546 | S * | 9/2004 | Moon | D6/675.1 |
| 6,814,362 | B2 * | 11/2004 | Hanson | B62B 3/006 108/107 |
| 7,386,954 | B2 | 6/2008 | Korte et al. | |
| 7,886,673 | B2 * | 2/2011 | Korte | A01G 9/143 108/110 |
| D634,570 | S * | 3/2011 | Lin | D6/703.4 |
| 7,971,943 | B2 * | 7/2011 | Quella | A47B 57/00 108/107 |
| 8,376,156 | B2 * | 2/2013 | Jarvis | A47B 47/045 108/147.12 |
| 8,616,388 | B2 * | 12/2013 | Butler | A47B 43/00 108/106 |
| D703,468 | S * | 4/2014 | Ho | D6/675.1 |
| 8,875,910 | B2 * | 11/2014 | Wurr | A47B 57/50 211/187 |
| D724,357 | S * | 3/2015 | Lim | A47B 47/00 D6/675.1 |
| 9,496,689 | B2 * | 11/2016 | Boehme | H05K 7/183 |
| 2001/0004064 | A1 * | 6/2001 | Battaglia | A47B 57/54 211/187 |
| 2003/0029362 | A1 * | 2/2003 | Ondrasik | A47F 5/01 108/110 |
| 2003/0048048 | A1 * | 3/2003 | Altena | H02B 1/01 312/265.4 |
| 2003/0160409 | A1 | 8/2003 | Hanson et al. | |
| 2004/0035813 | A1 * | 2/2004 | Sparkowski | A47F 5/137 211/187 |
| 2005/0055877 | A1 * | 3/2005 | Schomaker | A01G 9/143 47/39 |
| 2005/0081438 | A1 * | 4/2005 | Schomaker | A01G 9/143 47/39 |
| 2006/0218858 | A1 | 10/2006 | Korte | |
| 2008/0092787 | A1 * | 4/2008 | McAllister | A47B 57/265 108/147.12 |
| 2008/0121600 | A1 * | 5/2008 | Korte | A47B 31/00 211/187 |
| 2008/0230502 | A1 * | 9/2008 | Poortvliet | B23P 19/04 211/187 |
| 2011/0253656 | A1 * | 10/2011 | Vermeer | A47F 5/137 211/85.8 |
| 2016/0022034 | A1 * | 1/2016 | Hu | A47B 47/00 211/186 |
| 2016/0029786 | A1 * | 2/2016 | Davis | A47B 57/04 211/85.8 |
| 2016/0029787 | A1 | 2/2016 | Go | |
| 2016/0192776 | A1 * | 7/2016 | Mogensen | A47B 57/06 108/157.13 |
| 2016/0198848 | A1 * | 7/2016 | Mogensen | A47B 57/402 211/187 |
| 2016/0297458 | A1 * | 10/2016 | Churchvara | B62B 3/02 |

FOREIGN PATENT DOCUMENTS

| | | |
|---|---|---|
| DE | 3619262 | 12/1987 |
| DK | 200001677 | 5/2002 |
| EP | 1686037 | 8/2006 |
| EP | 2340978 | 7/2011 |
| EP | 2430947 | 3/2012 |

(56) References Cited

FOREIGN PATENT DOCUMENTS

| | | |
|---|---|---|
| EP | 3141453 | 3/2017 |
| FR | 2319842 | 2/1977 |
| GB | 1278478 | 6/1972 |
| JP | 10-167075 | 6/1998 |
| WO | 2007/063109 | 6/2007 |
| WO | 2016/056912 | 4/2016 |

* cited by examiner

TROLLEY FOR CARRYING GOODS

CROSS-REFERENCE TO RELATED APPLICATIONS

This application claims priority to and the benefit of the filing of Netherlands Patent Application No. 2015372, filed on Aug. 31, 2015, and the specification and claims thereof are incorporated herein by reference.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable.

INCORPORATION BY REFERENCE OF MATERIAL SUBMITTED ON A COMPACT DISC

Not Applicable.

STATEMENT REGARDING PRIOR DISCLOSURES BY THE INVENTOR OR A JOINT INVENTOR

Not Applicable.

COPYRIGHTED MATERIAL

Not Applicable.

BACKGROUND OF THE INVENTION

Field of the Invention (Technical Field):

The present invention relates to a trolley comprising a plurality of rectangular and elongated shelves comprising a plate providing a surface for carrying goods, such as potted plants and flowers, and hooks, preferably a hook at each corner of the plate, and a plurality of posts, typically four, i.e., one at each corner of the trolley, provided with a series of openings, e.g., slots, receiving the hooks. The invention further relates to a pool of trolleys and a method of modifying a trolley.

Description of Related Art Including Information Disclosed Under 37 C.F.R. §§ 1.97 and 1.98:

Trolleys for potted plants, flower et cetera are known in the art, e.g., from EP 2 340 978, which relates to a "holder (20) for the reduction of noise from a shelf mounted on the pillars (50) of a load carrier by means of holders. The holder is introduced into complementary slots in the pillars (50) and is configured with a notch (22) having a carrier face. Hereby the holder is able to engage with the slot in such a manner that the holder has bearing on the pillar. The holder comprises a resilient element (30) arranged in the notch to the effect that the resilient element (30) causes the carrier face to not enter into contact with the pillar when the shelf is not loaded with goods; and that the resilient element is compressed when a load of goods is loaded onto the shelf."

DK 2000 01677 relates to a method and installation for separating and assembly of shelf containers which involve the containers having a base frame, removable corner uprights and shelves.

US 2003/160409 relates to a wheeled agricultural cart for transporting plant materials having at least one removable shelf. The cart has vertical pillars at each corner thereof with a plurality of substantially rectangular vertical slots. Each shelf has a frame including downward facing hook members at each corner thereof. The shelf is removably attached to the cart by insertion of each hook member into a slot on a corresponding vertical pillar.

At www.bc-container.de, a container shelf is disclosed having hooks extending in lateral direction and posts comprising series of openings on adjoining sides.

BRIEF SUMMARY OF THE INVENTION

The trolley according to the present invention is intended for use as returnable transport trolley, i.e., a trolley that is part of a vast and open pool of trolleys, e.g., hundreds of thousands or more, for moving goods in standard sizes. Such a pool facilitates logistics from producers via wholesalers, cross-docking, and/or storage to retailers and vice versa. An open pool enables free exchange of trolleys, which saves time, transport costs, and administration. Empty trolleys can be exchanged for trolleys carrying goods, or the other way round, all through the supply chain.

Such pools are typically owned, managed, and maintained by one or few entities and items from the pool are hired and used by many entities. Maintaining a pool is a costly affair, especially when the pool ages and/or when similar, cheaper items of an inferior quality are added to the pool by third parties to avoid having to hire shelfs.

Replacing a pool requires much time and involves complicated logistics, especially when the pool comprises millions or tens of millions of items or parts, such as shelves and posts. Implementing innovations in the new pool may complicate logistics.

The present invention addresses the vastly complex replacement of an existing pool of millions of trolleys comprising tens of millions of shelves with a new pool.

It is an object of the present invention to reduce the costs of such replacement and to simplify logistics during replacement of the existing (old) pool with a new pool, while at the same time preventing shelves from the old pool from being used in the new (replaced) pool.

To this end, in the trolley according to the present invention, the hooks extend in lateral direction, i.e., in a direction parallel to or having a component parallel to the short sides of the shelf, and a series of openings is provided in precisely one side of the posts, preferably of each of the posts, or in precisely two and opposite sides of the posts, preferably of each of the posts.

The combination of such posts and shelves having such hooks prevents or at least hinders existing shelves having hooks extending in longitudinal direction from being used in the new pool.

In an embodiment, the trolley comprises a rectangular and elongated frame provided with a holder for a post at each corner and a post is placed in each holder. In a refinement, the holders and posts all have a square cross-section with the posts having outer dimensions that are slightly smaller than de inner dimensions of the holders, i.e., the posts are slidably and removably positioned in de holders in one of four positions. Thus, existing trolleys can be modified in a straightforward manner, as will be explained in more detail below, and existing posts can be re-used in a new pool of (modified) trolleys. In principle, it suffices to only replace the shelves.

In an embodiment, one or more of the hooks are formed from a metal strip bent about an axis extending perpendicular to the central plane of the plate.

In a refinement, the hooks comprise two portions of a strip, preferably diverging or parallel portions, each of the portions comprises a notch, and the notches are aligned.

In an embodiment, a portion of a strip extends along and/or in a side of the plate.

In another embodiment, a first portion of the strip extends along and/or in a first side of the plate and a second portion of the strip extends along and/or in a second side of the plate, the second side extending at a right angle with the first side.

Hooks extending in lateral direction imply a more complicated distribution and transfer of forces from the plate of the shelf via the hooks to the posts, compared to shelves comprising hooks extending in longitudinal direction. With these hooks made from a metal strip, both the short sides and the long sides of the plate are directly supported by the hooks, i.e., the long sides via the inner legs of the hooks and the short sides via the outer legs of the hooks.

It is preferred that the shelves are rectangular and elongated and comprise a hook at each corner. It is further preferred that the shelves have a length in a range from 1250 to 1350 mm, e.g., 1320 mm, and a width in a range from 530 to 570 mm, e.g., 550 mm.

The invention further relates to a pool comprising more than a thousand, preferably more than ten thousand, preferably more than a hundred thousand trolleys as described above.

The invention further relates a method of modifying a trolley comprising a plurality of rectangular and elongated shelves comprising a plate providing a surface for carrying goods, such as potted plants and flowers, and hooks extending in longitudinal direction, i.e., in a direction parallel to or having a component parallel to the long sides of the shelf, and a plurality of posts (also known as pillars or uprights) provided with a series of openings receiving the hooks, the method comprising the steps of removing the shelves from the trolley, when applicable lifting the posts from the holders, turning the posts a quarter turn (90 degrees or approximately 90 degrees), when applicable placing the posts back into the holders, and placing shelves comprising a plate and hooks extending in transverse direction in the trolley. In an embodiment of the trolley and method of the present invention, each of the posts of the trolley is turned to a position where the series of openings faces the longitudinal vertical plane of the trolley.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Figure 1:
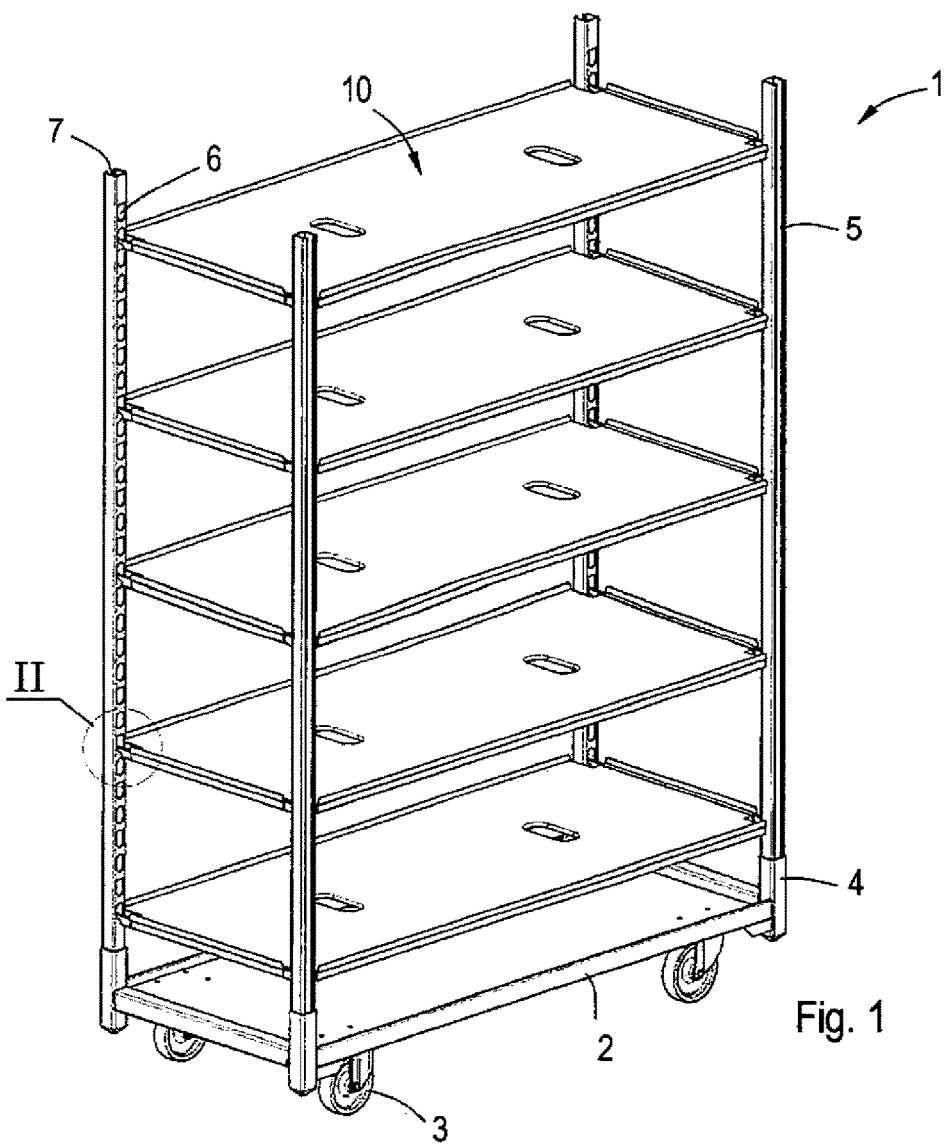
FIG. 1 is a perspective view of a trolley carrying a plurality of shelves according to the present invention.
Figure 2:
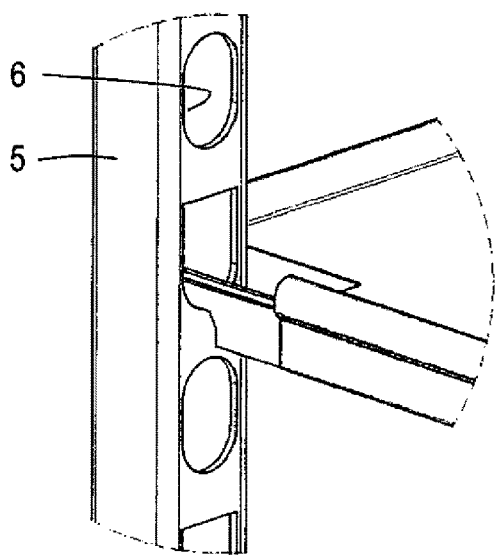
FIG. 2 is a detail of FIG. 1, showing a corner of a shelf hooked in a corner post of the trolley.

FIGS. 1 and 2 show a trolley 1 for carrying goods, such as potted plants and flowers, comprising a rectangular and elongated frame 2 provided with four wheels 3 at its underside near each corner and a holder 4 for a post 5 at each corner. A post 5 is placed in each holder. In this example, the holders and posts all have a square cross-section with the posts having outer dimensions (width) that are slightly smaller than de inner dimensions of the holders. Thus, the posts are slidably and removably positioned in de holders in one of four positions. Each post has on one of its four sides a series of openings 6 and on the side opposite from the openings a slot 7 running the length of the post. A plurality of shelves 10 is mounted in the trolley.

Figure 3:
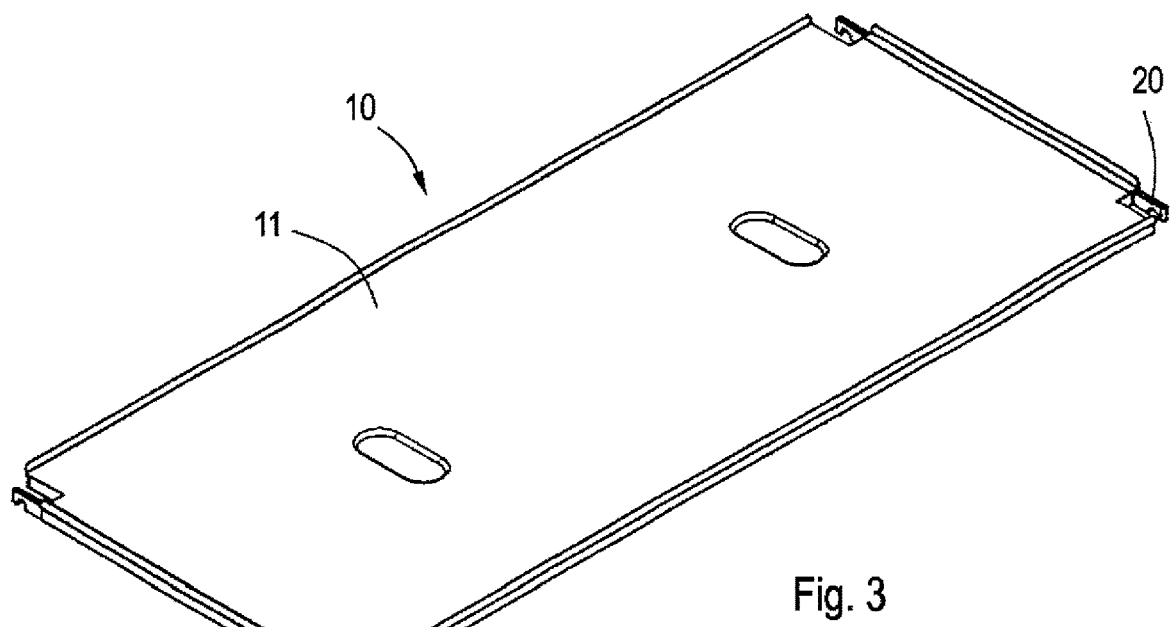
FIGS. 3 and 4 are perspective top views of a shelf and a cross-sectioned shelf according to the present invention.
Figure 4:
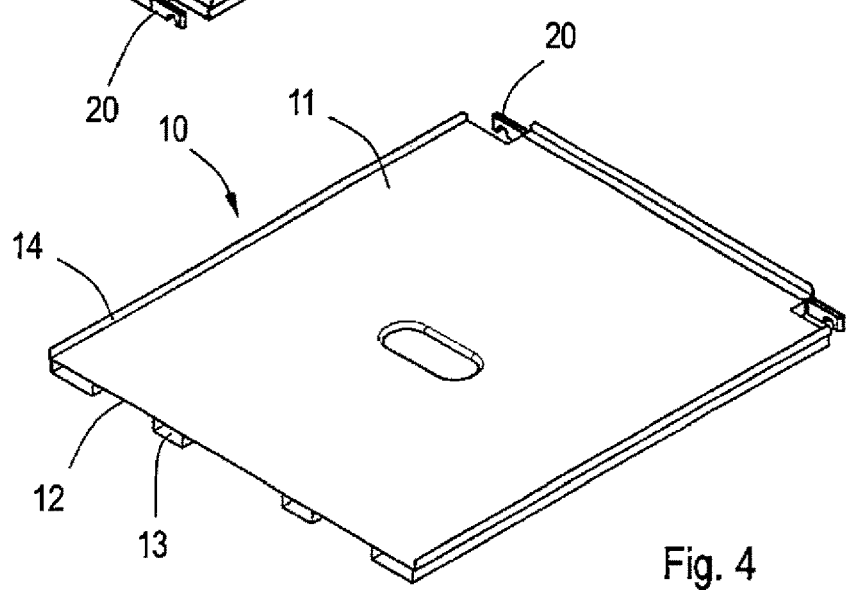

FIGS. 3 and 4 show a single rectangular and elongated shelf 10 suitable to be mounted in the trolley 1 shown in FIGS. 1 and 2. The shelf had a plate 11 providing a planar top surface 12 for carrying goods. A plurality of box girders 13 is formed on and/or attached to the bottom surface of the plate, to render the shelf sufficiently stiff. The long and short edges of the plate are provided with raised edges 14.

The shelf has a hook 20 at each corner. With these hooks, the shelf 10 can be mounted at a selected height in the trolley by tilting the shelf, inserting a pair of hooks in openings at the selected height, lowering the shelf until it is horizontal and slightly shifting the shelf to insert the pair of hooks on the opposite side of the shelf in openings 6 in the posts 5 on the opposite side of the trolley 1.

Figures 5, 6, 7:
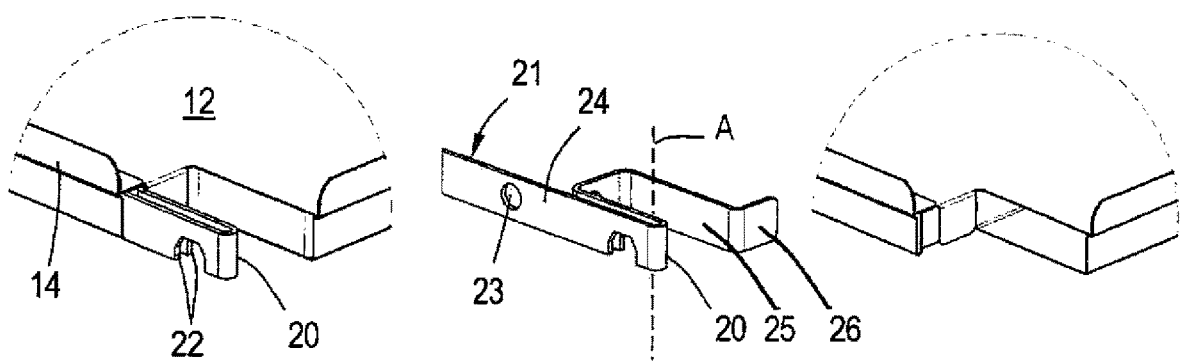
FIGS. 5 to 7 show details of a hook portion of the shelf is a detail of the shelf shown in FIG. 3.

As shown in FIGS. 5 and 6, the hooks 20 are made from a strip 21 of resilient steel having a yield strength of 600 MPa and a thickness of 2 mm and a height of 20 mm. At both ends, the strip is bent about an axis A extending in the height direction of the strip (perpendicular to the central plane of the plate in the finished shelf). Two notches 22 are provided near each end of the strip, which notches align after bending the strip about axis A, thus forming hooks.

The strip is provided with a plurality of holes 23, that allow e.g., clinching the ends of the plate to the strip, and four notches.

In this example, the strip is bent, at each end, at three further positions and all about axes extending in the height direction of the strip, to form portions 24 for clinching the plate to the strip, portions 25 for closing off and end of a box girder in the plate and portions 26 extending in a box girder in the plate.

The plate 11 is clinched to the strip 21 by folding edge portions of the plate over the strip and clinching portion of the plate together through the openings 23 in the strip. Identical but mirrored strips are attached to each of the short sides of the shelf, as shown in FIGS. 3 and 8.

The trolley was obtained by modifying a trolley having shelves with hooks extending in longitudinal direction, more specifically by removing the shelves from the trolley 1, lifting the posts 5 from the holders 4, turning the posts a quarter turn to a position where the series of openings 6 of each of the posts faces the (imaginary) longitudinal vertical plane of the trolley 1, placing the posts 5 back into the holders 4, and placing the shelves 10 comprising hooks 20 extending in transverse direction in the trolley 1.

The invention is not restricted to the above-described embodiments, which can be varied in a number of ways within the scope of the claims. For instance, a series of openings can be provided in precisely two and opposite sides of the posts.

What is claimed is:

1. A cart comprising:
    a plurality of elongated shelves,
    each of said elongated shelves comprising:
        a pair of long sides;
        a pair of short sides, said short sides are perpendicular to said long sides;
        a plate, said plate providing a planar top surface for supporting objects thereon; and
        a plurality of hooks,
        wherein each hook comprises:
            a strip bent around axes extending perpendicular to a plane of said top surface, the strip comprises
            a first portion that has a first notch therein, a second portion that has a second notch therein, a third portion, a fourth portion, and a fifth portion; wherein the first notch aligns with the second notch, wherein said first portion is generally parallel to the second portion, said third portion is generally perpendicular to the second portion, said fourth portion is generally perpendicular to the third portion and parallel to the first portion and the second portion, and said fifth portion is generally perpendicular to the fourth portion, wherein the fifth portion is configured to be inserted within a portion of a corresponding shelf from said plurality of shelves respectively
    wherein each first portion and each second portion of each of the plurality of hooks extends along a respective short side for each respective shelf respectively in a direction generally perpendicular relative to the long sides of each respective shelf;
    a plurality of posts, each of said plurality of posts comprising a plurality of openings disposed therein respectively, wherein said plurality of openings are configured to receive said hooks of said plurality of shelves with the first notches and the second notches of each shelf engaging corresponding openings from said plurality of openings to mount the shelves to the posts.

2. The cart according to claim 1, comprising a generally rectangular base having a holder at each corner of the base, wherein each holder receives a corresponding post from said plurality of posts.

3. The cart according to claim 2, wherein each said holder and each of said plurality of posts each have a cross-section, and wherein each post comprises an outer dimension that is slightly smaller than an inner dimension of each holder.

4. The cart according to claim 1, wherein each fifth portion of each strip extends in a channel or girder of each shelf respectively.

5. The cart according to claim 1, wherein the said shelves each have a length in a range from 1250 to 1350 mm and a width in a range from 530 to 570 mm.

6. The cart of claim 1, wherein said plurality of openings define a plurality of slots.

\* \* \* \* \*